March 21, 1939.     N. M. STANLEY     2,151,573
SYNTHETIC RESIN MAGNIFYING GLASS
Original Filed Sept. 14, 1935
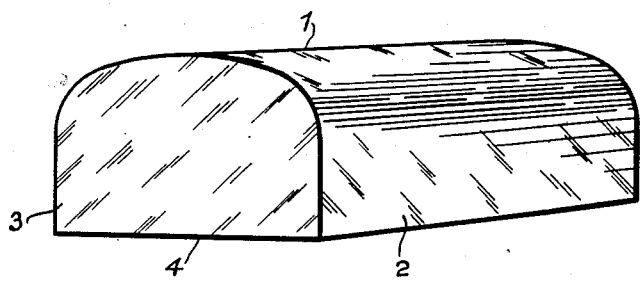
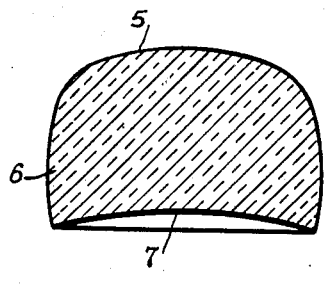
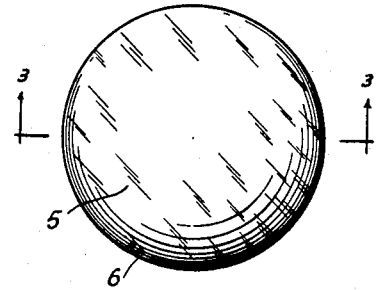
INVENTOR:
NATHAN M. STANLEY.
BY
ATTORNEYS.

Patented Mar. 21, 1939

2,151,573

UNITED STATES PATENT OFFICE 2,151,573

SYNTHETIC RESIN MAGNIFYING GLASS

Nathan M. Stanley, Dayton, Ohio

Original application September 14, 1935, Serial No. 40,595. Divided and this application October 23, 1936, Serial No. 107,223

1 Claim. (Cl. 88—39)

My invention relates to magnifying lenses.

It is the particular object of my invention to provide a magnifying lens of synthetic materials of such type that it can be moulded and extruded in final form without the necessity of expensive grinding and polishing operations ordinarily required in connection with the manufacture of magnifying lenses made of glass.

It is an object of my invention to provide a novel form of magnifying lens of synthetic materials.

It is a further object of my invention to provide a magnifying lens of synthetic resin material which, in addition to possessing the advantages of a lens formed of glass, is lighter in weight, cheaper to manufacture, substantially chip proof, tough, water resistant and stronger than glass.

It is a further object of my invention to provide such a lens which is of such shape as to secure the ultimate degree of vision of the material sought to be magnified by the lens.

The surfacing of glass is difficult and expensive and this operation is eliminated by my invention.

These and other objects and advantages will appear from the following description taken in connection with the drawing.

This application is a division of my application Serial No. 40,595, filed September 14, 1935, which matured into United States Letters Patent No. 2,086,286, granted July 6, 1937.

In the drawing:

Figure 1 is a perspective view of one form of lens constructed according to the principles of my invention;

Figure 2 is a top plan view of a second form of magnifying lens constructed according to the principles of my invention;

Figure 3 is an elevational view, in section, of the structure shown in Figure 2, taken along the line 3—3 of Figure 2.

While the principles of my invention may be practiced by utilizing various types of synthetic plastic resins which possess optical properties, it is preferable that those employed be cheaper than glass. A typical resin of this character, which I have employed is water-white and as clear as ordinary crown glass. It does not chip nor break when dropped. It is exceedingly tough. It is a synthetic resin of the acrolein type derived from coal tar. It is a thermoplastic resin, readily softening at approximately 248 degrees F. It is capable of being machined, turned, curved, and cut, and is possessed of an extremely high tensile strength and high resistance to water. It is unaffected by dilute acids and is resistant to attacks of alkalis and alcohols. Furthermore, it is capable of being cemented. In the trade, in Great Britain, this resin is known and sold under the trade name of "Resin-M".

While the above described material is preferable in the practice of my invention, the use of other resins is comprehended by me. For instance, urea-formaldehyde condensation products known under the trade names of "Pollopas", "Plastopal" and "Shellan" being resins which are clear, transparent and colorless as is glass, are possessed of the desired optical and transparent properties.

According to the principles of my invention, the lenses may be formed by extruding or moulding or by turning and forming the material. When moulded, the material emerges from the mould with such high polish that little, if any, additional polishing is necessary. The preliminary roughing or grinding, preliminary to polishing which is necessary in the manufacture of lenses from glass, is totally obviated.

In Figure 1, one form of magnifying lens, constructed according to the principles of my invention, is illustrated. This lens comprises a body having an arcuate top surface 1, straight side walls 2, straight end walls 3 and a flat bottom wall 4. The lens is of substantial longitudinal extent whereby, by its use, an area of substantial length may be magnified. This is extremely desirable in the reading of fine printed matter. The depth of the body is such that the lens may be placed directly upon the fine type or other material sought to be magnified.

The lens illustrated in Figures 2 and 3 is circular, provided with an arcuate top surface 5, slightly curved substantially cylindrical side walls 6 and slightly arcuate bottom surface 7. The provision of the slightly arcuate bottom wall 7 makes it possible for the lens to be directly supported by the matter sought to be magnified, while the slightly arcuate bottom surface thereof is spaced therefrom, the surface being protected from scratching.

It will be understood that the above described structure is merely illustrative of the manner in which the principles of my invention may be utilized and that I desire to comprehend within my invention such modifications as come within the scope of the claim and the invention.

Having thus fully described my invention what I claim as new and desire to secure by Letters Patent is:

As a new article of manufacture for use as a magnifying reading lens comprising a transparent body of relatively great length in proportion to its width provided with an elongated arcuate top surface, said body having straight side walls with curved surfaces of shorter radius than said top surface joining said top surface and side walls, straight end walls, and a flat bottom wall, the depth of the body being such that the lens may be placed directly upon the surface containing the material to be magnified.

NATHAN M. STANLEY.